Patented Feb. 5, 1952

2,584,315

UNITED STATES PATENT OFFICE 2,584,315

POLYESTER COPOLYMERS

Robert J. Agnew, Pawling, N. Y., assignor to The Texas Company, New York, N. Y., a corporation of Delaware No Drawing. Application May 20, 1948,
Serial No. 28,279

1 Claim. (Cl. 260—45.4)

This invention relates to copolymers of diallyl esters of phthalic, tetrahydrophthalic and chlorotetrahydrophthalic acids and an unsaturated polyester. Copolymers which form the subject of this invention are characterized by chemical inertness and thermal stability. The possession of these properties marks the copolymers of this invention as components of excellent coating compositions.

The copolymers of this invention are formed by reaction between a diallyl ester of phthalic, tetrahydrophthalic, chlorotetrahydrophthalic acid or mixtures thereof and an unsaturated mixed polyester in which a dihydroxy alkane or alkene containing 2 or more carbon atoms is esterified with two dibasic acids. One of the two dibasic acids used in the preparation of the polyester is an aromatic dibasic acid, while the other dibasic acid is an alpha-olefinic unsaturated dibasic acid which constitutes at least 10 per cent of the total dibasic acid content of the mixed polyester. Phthalic acid and derivatives thereof are preferred aromatic acids for the preparation of mixed polyesters; maleic, fumaric and itaconic are preferred alpha-olefinic unsaturated acids for the preparation of mixed polyesters.

The copolymer comprises 5 to 45 weight per cent diallyl ester of phthalic, tetrahydrophthalic or chlorotetrahydrophthalic acid and 55 to 95 weight per cent of unsaturated polyester. Ordinarily, the copolymer is formed by reacting 20 to 35 weight per cent diallyltetrahydrophthalate, diallylphthalate or diallyl chlorotetrahydrophthalate with 65 to 80 weight per cent unsaturated polyester. When the components of the copolymer are reacted within this latter described weight ratio, the resulting copolymer is particularly characterized by inertness to alkalis, acids, solvents and by high thermal stability.

The polyester component of the copolymer is prepared by condensing a dihydroxy alkane or alkene such as ethylene glycol, propylene glycol, vinylethylene glycol with a mixture of two dibasic acids or their anhydrides. Hereafter, whenever it is stated that a dibasic acid is employed, it will be understood that its anhydride may be substituted therefor without any change whatsoever in the properties of the resulting polyester. One of the dibasic acids employed for the preparation of the mixed polyester is an aromatic dibasic acid such as phthalic, terephthalic and tetrachlorophthalic acid; the other dibasic acid is an alpha-olefinic unsaturated dibasic acid such as maleic, fumaric and itaconic acids. The alpha-olefinic unsaturated dibasic acids which constitute at least 10 per cent of the total dibasic acid content of the unsaturated polyester have the generic formula

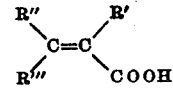

wherein R', R" and R'" are either hydrogen atoms, alkyl groups, cyclo-alkyl groups, carboxyl group or their substitution products, at least one of the R', R", R'" groups being a carboxylic acid group or a carboxylic acid-substituted group.

Ordinarily, the alpha-olefinic unsaturated dibasic acid and the aromatic dibasic acid are employed in equimolecular quantities for the preparation of the mixed polyester. However, the alpha-olefinic unsaturated dibasic acid must comprise at least 10 per cent and not more than 80 per cent of the total dibasic acid content of the mixed polyester. The properties of the copolymer resulting from the interpolymerization of diallyltetrahydrophthalate, diallylphthalate or diallyl chlorotetrahydrophthalate and the unsaturated polyester are affected by the amount of alpha-olefinic unsaturated dibasic acid employed in the preparation of the mixed polyester. The best results from the viewpoint of chemical inertness are obtained when approximately an equimolecular ratio of aromatic dibasic acid and alpha-olefinic unsaturated dibasic acid is employed for the preparation of the polyester.

The dihydroxy alkane or alkene containing at least 2 carbon atoms employed in the preparation of the unsaturated polyester advantageously contains two primary alcohol groups because esterification is effected more readily therewith. Ethylene glycol, 1,4-butanediol and 1,6-hexanediol are examples of the preferred type glycol containing two primary alcohol groups. However, other glycols such as propylene glycol, 1,2-butylene glycol, 1,2-hexanediol may also be used in the process of this invention. It is preferred to use dihydroxy alkanes in the preparation of the polyesters.

The mixed polyesters are prepared by reacting a dihydroxy alkane or alkene such as ethylene glycol with a mixture comprising an aromatic dibasic acid and an alpha-olefinic unsaturated dibasic acid at temperatures of 150 to 225° C. The polyesterification is advantageously effected in the presence of an inert gas in order to prevent cross-linking between the polyester molecules by the formation of oxygen linkages between the activated double bonds of the unsaturated dibasic acid. Oxygen may be excluded either by passing the inert gas over the surface of the reactants or by bubbling the gas through the liquid reactants. Bubbling of the inert gas through the liquid reactants has the advantages of agitating the mixture and also carrying away at least part of the water formed during the reaction. The esterification reaction is continued until the polyester contains 5 to 12 condensation units per molecule.

It is generally preferable to employ a slight excess, for example, 0.05 to 0.1 mol excess, of glycol in order to hasten the condensation reaction. Moreover, it is also possible to employ an inert solvent such as toluene for the preparation of the mixed polyester. When a solvent is employed, the reactants are heated in a solvent mixture under reflux and the water split out during the esterification is separated from the condensed solvent prior to the return of the solvent to the reaction zone. After esterification is complete the solvent is stripped from the polyester in vacuum. An inert gas is also used to prevent oxygen cross-linkages when a solvent is employed during the polyesterification reaction.

Copolymerization of the diallyl ester of phthalic, tetrahydrophthalic, chlorotetrahydrophthalic acid or mixtures thereof with a mixed polyester prepared as heretofore described is effected in the presence of a peroxide catalyst and at a temperature of 50 to 110° C. The catalyzed mixture is poured into a suitable mold and subjected to temperatures of 50 to 110° C. until the copolymerization is substantially complete which ordinarily requires from 2 to 7 days. The duration of the copolymerization reaction depends upon the components of the polyester, the specimen thickness, the catalyst concentration and other operational factors.

Copolymerization will take place slowly in the absence of a catalyst but it is preferred to employ an organic peroxide catalyst. Acid peroxides such as acetyl peroxide, benzoyl peroxide, phthalic peroxide and succinic peroxide are preferred for the copolymerization reaction. Other peroxides such as tertiary butyl hydro-peroxide, may also be used to catalyze the copolymerization reaction. In a preferred procedure for the copolymerization of a diallyl ester of phthalic, tetrahydrophthalic, or chlorotetrahydrophthalic acid and a mixed polyester, 0.25 to 1.0 per cent by weight of acetyl or benzoyl peroxide is employed. The peroxides may be dissolved with the diallyl ester prior to its mixing with the mixed polyester, or the catalyst may be added to a mixture of diallyl ester and the unsaturated polyester.

It is possible to vary the physical and chemical properties of the copolymers resulting from the reaction between the diallyl ester and the mixed polyester by changing the composition and degree of condensation of the mixed polyester, by alternating the ratio of mixed polyester to diallyl ester and by modifying the copolymerization conditions. By alternating the aforementioned variables, the character of the copolymers can be varied to some extent but all copolymers of the type described herein are hard, tough and resistant to chemicals.

The following examples will illustrate the procedure employed for preparing the novel compounds of this invention.

EXAMPLE I 323 grams of ethylene glycol, 245 grams of maleic anhydride and 370 grams of phthalic anhydride were reacted at a temperature of about 175 to 210° C. The reaction mixture contained equimolar quantities of maleic anhydride and phthalic anhydride with a slight molar excess of ethylene glycol. The mixture was continuously agitated and the reaction was effected in an atmosphere of carbon dioxide in order to minimize oxygen cross-linking. After a period of about 3-3.5 hours, a clear water-white mixed polyester was produced having an acid number of 43.8 and containing about 7.5 condensation units per molecule (calculated from the average molecular weight).

688 grams of this polyester and 298 grams of diallyl tetrahydrophthalate were thoroughly mixed with 6.5 grams of acetyl peroxide; the mixture was poured into a suitable mold and heated at 32° C. for 20 hours, at 65° C. for 6 hours and at 80° C. for 66 hours, thus making an overall curing time of 92 hours. As a result of this treatment, there was obtained a clear water-white hard, tough copolymer comprising 70 weight per cent of mixed polyester and 30 weight per cent of diallyl tetrahydrophthalate. The properties of this copolymer are listed under compound I in the table. The copolymer was extraordinarily resistant to chemicals, only suffering a 6.5 per cent loss in weight on immersion in 10 per cent sodium hydroxide for 7 days, and a 0.41 per cent loss in weight on immersion in 1 per cent sodium hydroxide for 7 days.

EXAMPLE II 136.5 grams of ethylene glycol, 98 grams of maleic anhydride and 148 grams of phthalic anhydride were reacted at a temperature of about 175 to 190° C. The reaction mixture contained equimolar quantities of maleic anhydride and phthalic anhydride with a slight molar excess of ethylene glycol. The mixture was continuously agitated and the reaction was effected in an atmosphere of carbon dioxide in order to minimize oxygen cross-linking. After a period of about 5-5.5 hours, a clear water-white mixed polyester was produced having an acid number of 44.2 and containing about 7.4 condensation units per molecule. 320 grams of this polyester and 137 grams of diallyl phthalate were thoroughly mixed with 4.6 grams of acetyl peroxide; the mixture was poured into a suitable mold and heated at 65° C. for 19 hours, and at 80° C. for 120 hours. As a result of this treatment, there was obtained a clear, water-white, tough copolymer comprising 70 weight per cent of mixed polyester and 30 weight per cent of diallyl phthalate. The properties of this copolymer are listed under compound II in the table.

EXAMPLE III 161.3 grams of ethylene glycol, 122.5 grams of maleic anhydride and 185.0 grams of phthalic anhydride were reacted at a temperature of about 175 to 190° C. The reaction mixture contained equimolecular quantities of maleic anhydride and phthalic anhydride with a slight molar excess of ethylene glycol. The mixture was continuously agitated and the reaction was effected in an atmosphere of carbon dioxide in order to minimize oxygen cross-linking. After a period of about 9.5 to 10 hours, a clear water-white mixed polyester was produced having an acid number of 45.9 and containing about 7.4 condensation units per molecule. 320 grams of this polyester and 137 grams of diallyl chlorotetrahydrophthalate (4-chloro, 1 2,3,6-tetrahydrophthalic acid was prepared by a Diels-Alder reaction between chloroprene and maleic anhydride) were thoroughly mixed with 4.6 grams of acetyl peroxide; the mixture was poured into a suitable mold heated at 80° C. for 144 hours. As a result of this treatment, there was obtained a clear light yellow tough copolymer comprising 70 weight per cent of mixed polyester and 30 weight per cent of diallyl chlorotetrahydrophthalate. The properties of this copolymer are listed under compound III in the table.

EXAMPLE IV 115 grams of ethylene glycol, 163 grams of fumaric acid and 308 grams of phthalic anhydride were reacted at a temperature of about 175 to 190° C. The reaction mixture contained equimolar quantities of fumaric acid and phthalic anhydride and a slight molar excess of ethylene glycol. The mixture was continuously agitated and the reaction was effected in an atmosphere of carbon dioxide in order to minimize oxygen cross-linking. After a period of about 3 to 3.5 hours, a clear water-white mixed polyester was produced having an acid number of 45.1 and containing about 7.3 condensation units per molecule. 375 grams of this polyester and 161 grams of diallyl tetrahydrophthalate were thoroughly mixed with 5.4 grams of acetyl peroxide; the mixture was poured into a suitable mold and heated at 65° C. for 22 hours and at 80° C. for 74 hours. At the end of this treatment, there was obtained a clear water-white tough copolymer comprising 70 weight per cent of mixed polyester and 30 weight per cent of diallyl tetrahydrophthalate. The properties of this copolymer are listed under compound IV in the table.

EXAMPLE V 136.5 grams of ethylene glycol, 98 grams of maleic anhydride and 286 grams of tetrachlorophthalic anhydride were reacted at a temperature of about 175° C. The reaction mixture contained equimolar quantities of maleic anhydride and tetrachlorophthalic anhydride and a slight molar excess of ethylene glycol. The mixture was continuously agitated and the reaction was effected in an atmosphere of carbon dioxide in order to minimize oxygen cross-linking. After a period of about 6 to 6.5 hours, a clear light yellow mixed polyester was produced having an acid number of 32.1 and containing about 7.3 condensation units per molecule. 320 grams of this polyester and 137 grams of diallyl tetrahydrophthalate were thoroughly mixed with 4.6 grams of acetyl peroxide; the mixture was poured into a suitable mold and heated at 65° C. for 16.5 hours and 80° C. for 120 hours. At the end of this treatment, there was obtained a clear light yellow tough copolymer comprising 70 weight per cent of mixed polyester and 30 weight per cent of diallyl tetrahydrophthalate. The properties of this copolymer are listed under compound V in the table.

EXAMPLE VI 209 grams of propylene glycol, 123 grams of maleic anhydride and 185 grams of phthalic anhydride were reacted at a temperature of about 175 to 190° C. The reaction mixture contained equimolar quantities of maleic anhydride and phthalic anhydride and a slight molar excess of propylene glycol. The mixture was continuously agitated and the reaction was effected in an atmosphere of carbon dioxide in order to minimize oxygen cross-linking. After a period of about 7.5 to 8.0 hours, a clear water-white mixed polyester was produced having an acid number of 43.8 and containing about 7.0 condensation units per molecule. 350 grams of this polyester and 150 grams of diallyl tetrahydrophthalate were thoroughly mixed with 5 grams of acetyl peroxide; the mixture was poured into a suitable mold and heated at 65° C. for 22 hours and at 80° C. for 74 hours. At the end of this treatment, there was obtained a clear water-white tough copolymer comprising 70 weight per cent of mixed polyester and 30 weight per cent of diallyl tetrahydrophthalate. The properties of this copolymer are listed under compound VI in the table.

The properties of the copolymers prepared as described in the foregoing examples are summarized in the table. In addition, compound VII is a copolymer prepared by the reaction of 30 weight per cent diallyl tetrahydrophthalate and 70 weight per cent mixed polyester prepared by the polyesterification of equimolar quantities of maleic and phthalic anhydride with ethylene glycol; it is similar in composition to compound I prepared in Example I with the difference that the compound VII was copolymerized at one temperature; namely, 80° C., for 182 hours rather than at three different temperatures as was the case with compound I.

Table

| | I | II | III | IV | V | VI | VII |
|---|---|---|---|---|---|---|---|
| Rockwell Hardness | M-113 | M-116 | M-113 | M-112 | M-119 | R-120 | M-113 |
| Flammability, in./min | 0.67 | 0.44 | 0.79 | 0.52 | (1) | 0.88 | 0.46 |
| Flex. Strength, p. s. i | 10,600 | 14,070 | 13,400 | 13,600 | 9,560 | 10,600 | 10,600 |
| Compression Strength, p. s. i | 21,330 | 21,900 | 21,300 | 18,700 | 20,800 | 16,000 | 20,800 |
| Impact Strength, Ft. lb./in | 0.28 | 0.29 | 0.38 | 0.27 | 0.38 | 0.34 | 0.38 |
| Resistance to Chemicals, Per Cent Change in Weight after 7 days immersion: | | | | | | | |
| 10% NaOH | 6.5 | 10.0 | 4.6 | 1.8 | 0.50 | 7.7 | 3.4 |
| 1% NaOH | 0.41 | 1.4 | 0.33 | 0.80 | 0.07 | 1.7 | 0.05 |
| 95% $C_2H_5OH$ | 1.7 | 1.1 | 0.40 | 0.93 | 0.20 | 2.50 | 0.48 |
| 50% $C_2H_5OH$ | 0.11 | 1.2 | 0.46 | 1.3 | 0.27 | 2.2 | 0.59 |
| Acetone | 3.3 | 0.33 | 31.0 | 3.9 | 2.3 | (2) | 1.8 |

[1] Self-extinguishing.
[2] Distintegrated.

The chemical inertness of the copolymers of this invention is strikingly illustrated in the table. The resistance to alkali is particularly noteworthy; despite the fact that the copolymer contains a plurality of ester groups, immersion in 10 per cent NaOH for 7 days only causes between a 0.5 and a 13.4 per cent loss in weight. The alcohol and acetone insolubility of the copolymers is another striking property of the copolymers of this invention.

Natural or synthetic resins can be mixed with the copolymers of this invention in order to modify the properties thereof and to give products which are adapted for particular purposes. Alkyd resins, urea resins, phenolic resins, ether and ester derivatives of cellulose all can be admixed with the copolymers of this invention;

moreover, natural and synthetic rubber type products may be also used to modify the properties of the copolymers of this invention.

An advantage of the copolymers of this invention resides in the fact that the curing time is short. Ordinarily a period between 48 and 168 hours is sufficient for the curing of the copolymers by casting technique. The short curing time is of particular advantage when large blocks of copolymer are being cured.

An important advantage resides in the fact that no solvent is required for the curing of the copolymers of the present invention. Consequently, there are no shrinkage problems resulting from the employment of solvents if the copolymers are used as coating compositions. Since there is no solvent to be removed and since air is not needed to cure the copolymer, relatively thick layers may be applied in one operation when the copolymers are employed as coating compositions.

The copolymerization is effected either with the aid of heat, ultra-violet light, catalyst or combinations thereof; ordinarily a combination of heat and catalyst are employed to effect the copolymerization. The temperature during the copolymerization should be maintained between 50 and 100° C. It is advisable to initiate the copolymerization by maintaining the temperature in the lower part of this range, namely from 50 to 60° C. for an induction period; thereafter, the temperature can be raised to complete the copolymerization.

It is also practicable to mix fillers with the diallyl ester of phthalic or tetrahydrophthalic acid and unsaturated polyester prior to copolymerization. Wood flour, wood fiber, paper dust, clay, zein, glass wool, Carborundum, paper cloth, sand, granite dust, steel wool are examples of fillers that may be employed. The use of a filler does not materially alter the mode of copolymerization of the diallyl-ester and the unsaturated mixed polyester.

Obviously many modifications and variations of the invention, as hereinbefore set forth, may be made without departing from the spirit and scope thereof and, therefore, only such limitations should be imposed as are indicated in the appended claim.

I claim:

A copolymer formed by the copolymerization of about 30 weight per cent of the diallyl ester of 4-chloro, 1,2,3,6-tetrahydrophthalic acid and about 70 weight per cent of an unsaturated polyester formed by esterification of ethylene glycol with an equimolecular mixture of maleic anhydride and phthalic anhydride.

ROBERT J. AGNEW.

REFERENCES CITED

The following references are of record in the file of this patent:

UNITED STATES PATENTS

| Number | Name | Date |
| --- | --- | --- |
| 2,409,633 | Kropa | Oct. 22, 1946 |
| 2,423,042 | Muskat | June 24, 1947 |
| 2,428,787 | D'Alelio | Oct. 14, 1947 |
| 2,453,666 | Kropa | Nov. 9, 1948 |

OTHER REFERENCES

Carothers: Collected Papers, pub. 1940 by Interscience Publishers, N. Y., pp. 283 and 284.